(12) United States Patent
Cho et al.

(10) Patent No.: US 9,888,341 B2
(45) Date of Patent: Feb. 6, 2018

(54) DATA TRANSMITTING METHOD USING WLAN

(71) Applicants: LG ELECTRONICS INC., Seoul (KR); INDUSTRY-ACADEMIC COOPERATION FOUNDATION, YONSEI UNIVERSITY, Seoul (KR)

(72) Inventors: Heejeong Cho, Seoul (KR); Seonglyun Kim, Seoul (KR); Jinho Choi, Seoul (KR); Jeemin Kim, Goyang-si (KR); Hyesung Kim, Seoul (KR); Hyunsoo Ko, Seoul (KR)

(73) Assignees: LG ELECTRONICS INC., Seoul (KR); INDUSTRY-ACADEMIC COOPERATION FOUNDATION, YONSEI UNIVERSITY, Seoul (KR)

( * ) Notice: Subject to any disclaimer, the term of this patent is extended or adjusted under 35 U.S.C. 154(b) by 172 days.

(21) Appl. No.: 14/599,361

(22) Filed: Jan. 16, 2015

(65) Prior Publication Data
US 2015/0382262 A1 Dec. 31, 2015

(30) Foreign Application Priority Data

Jun. 26, 2014 (KR) .................. 10-2014-0078840
Jun. 26, 2014 (KR) .................. 10-2014-0078841
Jul. 7, 2014 (KR) .................. 10-2014-0084503

(51) Int. Cl.
*H04W 4/02* (2009.01)
*H04W 28/02* (2009.01)
(Continued)

(52) U.S. Cl.
CPC ............... *H04W 4/02* (2013.01); *H04L 47/12* (2013.01); *H04L 47/2408* (2013.01);
(Continued)

(58) Field of Classification Search
CPC ... H04L 47/12; H04L 47/2408; H04L 47/823; H04L 5/00; H04W 28/0226;
(Continued)

(56) References Cited

U.S. PATENT DOCUMENTS 9,148,776 B1 * 9/2015 Schroeder ............ H04W 8/087
2005/0159167 A1 * 7/2005 Hakalin .................. H04L 45/00
455/453
(Continued)

*Primary Examiner* — Jeffrey M Rutkowski
*Assistant Examiner* — Shah Rahman
(74) *Attorney, Agent, or Firm* — Lee, Hong, Degerman, Kang & Waimey

(57) ABSTRACT

A method of receiving data of a user equipment (UE) according to an aspect of the present invention includes: sensing a current location for each specific period, and determining whether the sensed location is included in a specific upper usage-frequency location range; transmitting, through a communication network, information regarding whether the sensed location is included in the upper usage-frequency location range or whether the UE is being charged; upon reception of a wireless local area network (WLAN) access instruction from the communication network, accessing an accessible WLAN; transmitting an Internet protocol (IP) address for the WLAN through the communication network; receiving data in parallel from the communication network and the WLAN; and adjusting data received from the communication network and data received through the WLAN on the basis of information included in an IP header and transmission control protocol (TCP) header of the data.

7 Claims, 15 Drawing Sheets

(51) Int. Cl.
*H04L 12/911* (2013.01)
*H04L 12/801* (2013.01)
*H04L 12/851* (2013.01)
*H04W 84/04* (2009.01)
*H04W 84/12* (2009.01)
*H04W 36/24* (2009.01)
*H04W 48/04* (2009.01)
*H04W 48/18* (2009.01)

(52) U.S. Cl.
CPC ....... *H04L 47/823* (2013.01); *H04W 28/0226* (2013.01); *H04W 36/245* (2013.01); *H04W 48/04* (2013.01); *H04W 48/18* (2013.01); *H04W 84/042* (2013.01); *H04W 84/12* (2013.01)

(58) Field of Classification Search
CPC ... H04W 36/14; H04W 36/245; H04W 36/36; H04W 48/04; H04W 48/17; H04W 4/02; H04W 84/042; H04W 84/12; H04W 48/18
USPC .......................................................... 370/331
See application file for complete search history.

(56) References Cited

U.S. PATENT DOCUMENTS

| | | | | |
|---|---|---|---|---|
| 2007/0112948 A1* | 5/2007 | Uhlik | ............... | H04L 12/14 709/223 |
| 2008/0219281 A1* | 9/2008 | Akin | ................ | H04W 72/0453 370/419 |
| 2010/0058147 A1* | 3/2010 | Seferoglu | ............ | H04L 1/0009 714/776 |
| 2011/0182243 A1* | 7/2011 | Gallagher | ............. | H04W 36/14 370/328 |
| 2012/0034922 A1* | 2/2012 | Jones | .................... | H04W 28/08 455/438 |
| 2012/0057511 A1* | 3/2012 | Sivakumar | ........... | H04W 28/06 370/310 |
| 2013/0044741 A1* | 2/2013 | Lappetelainen | .. | H04W 36/0066 370/338 |
| 2013/0165119 A1* | 6/2013 | Lee | ..................... | H04W 76/026 455/435.2 |
| 2013/0285855 A1* | 10/2013 | Dupray | .................. | G01S 19/48 342/451 |
| 2013/0289846 A1* | 10/2013 | Mitchell | ................ | G06F 17/00 701/99 |
| 2014/0045481 A1* | 2/2014 | Fraley | ............... | H04W 52/0258 455/418 |
| 2014/0113653 A1* | 4/2014 | Wendling | ............ | H04L 41/0893 455/456.1 |
| 2014/0241183 A1* | 8/2014 | Comeau | ................ | H04L 5/0098 370/252 |
| 2014/0242954 A1* | 8/2014 | Chang | .................... | H04W 4/02 455/414.1 |
| 2014/0269363 A1* | 9/2014 | Lee | ..................... | H04W 64/006 370/252 |
| 2014/0282747 A1* | 9/2014 | Richman | ............. | H04W 76/026 725/62 |
| 2014/0307550 A1* | 10/2014 | Forssell | ................ | H04W 36/22 370/235 |
| 2015/0120865 A1* | 4/2015 | Lee | ....................... | H04W 36/02 709/217 |
| 2016/0050605 A1* | 2/2016 | Kim | ..................... | H04W 28/08 370/331 |

* cited by examiner

FIG. 7

| recording time | UE location (latitude) | UE location (longitude) |
|---|---|---|
| $t_1 + T_0$ | 37.561941N | 126.935627E |
| ⋮ | ⋮ | ⋮ |
| $t_n$ | 37.335835N | 126.584030E |
| ⋮ | ⋮ | ⋮ |
| $t_1$ | 37.451722N | 126.612701E |

FIG. 8

| usage-frequency rank | UE location (latitude) | UE location (longitude) |
|---|---|---|
| 1 | 37.561941N | 126.935627E |
| 2 | 37.505310N | 126.501255E |
| 3 | 37.335835N | 126.584030E |
| ⋮ | ⋮ | ⋮ |
| N | 37.451722N | 126.612701E |

FIG. 12

| Bit | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 |
|---|---|---|---|---|---|---|---|---|---|---|---|---|---|---|---|---|---|---|---|---|---|---|---|---|---|---|---|---|---|---|---|---|
| 0 | Version | | | | IHL | | | | DSCP | | | | | | ECN | | Total Length | | | | | | | | | | | | | | | |
| 32 | Identification | | | | | | | | | | | | | | | | Flags | | | Fragment Offset | | | | | | | | | | | | |
| 64 | Time To Live | | | | | | | | Protocol | | | | | | | | Header Checksum | | | | | | | | | | | | | | | |
| 96 | Source UP Address | | | | | | | | | | | | | | | | | | | | | | | | | | | | | | | |
| 128 | Destination IP Address | | | | | | | | | | | | | | | | | | | | | | | | | | | | | | | |
| 160 | Options (if THL>5) | | | | | | | | | | | | | | | | | | | | | | | | | | | | | | | |

DATA TRANSMITTING METHOD USING WLAN

CROSS-REFERENCE TO RELATED APPLICATIONS

Pursuant to 35 U.S.C. § 119(a), this application claims the benefit of earlier filing date and right of priority to Korean Patent Application Nos. 10-2014-0078840, filed on Jun. 26, 2014, 10-2014-0078841, filed on Jun. 26, 2014, and 10-2014-0084503, filed on Jul. 7, 2014, the contents of which are all hereby incorporated by reference herein in their entirety.

BACKGROUND

1. Technical Field

The present invention relates to a method of transmitting data by using a wireless local area network (WLAN) in a wireless communication system, and more particularly, to a method of transmitting data by using user's context information sensed by a user equipment (UE).

2. Related Art

Since a wireless local area network (WLAN) is an untrusted network in general, a long term evolution (LTE) network interworks with the WLAN by using an S2b interface for interworking with an "untrusted non-3GPP access network".

In this case, in order to ensure reliable interworking, enhanced packet data gateway (ePDG) and 3GPP authentication authorization accounting (AAA) (3A) are added in addition to the existing evolved packet system (EPS) entity. The ePDG generates an authentication and tunnel for a user equipment (UE), and a WLAN is located between the ePDG and the UE.

The conventional technique makes a WLAN having a security problem a 'trust' network, so that the UE can receive a service while maintaining a security level of an LTE network even if communication is performed through the WLAN. Accordingly, interworking is possible when an access point (AP) of the WLAN accessed by the UE is directly connected with the ePDG. That is, interworking between the LTE network and the WLAN is possible only for a WLAN AP installed by a vendor who operates the LTE network. However, a current network context is a context in which the number of WLAN APs installed by an ordinary user is greater than the number of WLANs installed by a communication vendor. Therefore, there is a need for a traffic transmission scheme using the WLAN AP installed by the ordinary user.

If a congestion occurs in the LTE network, conventionally, an effect of offloading a traffic of the LTE network can be acquired only when a UE autonomously accesses a WLAN AP while experiencing an inconvenience of receiving a service according to the network congestion. Since a deterioration of service quality is experienced by a user in this process, there is a need for a method capable of increasing a radio duration transfer rate of the UE before the service quality deterioration occurs based on the congestion in the LTE network in order to ensure quality of experience (QoE) However, the conventional system has no method capable of determining whether the UE is in a context in which an access to the WLAN is possible, and there is no proposed method for generating a WLAN connection of the UE under the control of a network.

Meanwhile, a base station performs scheduling to effectively use a limited frequency resource. A representative method thereof includes a round robin scheme, a max C/I scheme, a proportional factor scheme, etc. The round robin scheme is a scheme in which resources are allocated by selecting users sequentially to ensure fairness preferentially. The max C/I scheme is a scheme in which a frequency is allocated preferentially to a user having a best channel state to maximize a total throughput of a system. The proportional factor scheme is a scheme in which a frequency is allocated on the basis of a channel state of a user and an average through of a service received up to now to simultaneously consider fairness and process ability.

The mobile communication system manages a current frequency resource on the basis of user request service information in order to control quality of service (QoS) of communication. Since a QoS requirement differs for each service, QoE may differ depending on a service type in use even if the same QoS level is ensured. Most of the conventional scheduling methods considering the service type allocate a frequency resource preferentially to a user who uses a real-time service (e.g., a streaming video or an online game). This is because a delay occurrence of the real-time service leads to a loss of information to be transmitted soon on a real-time basis, thereby causing a significant decrease in the QoE.

The conventional scheduling method does not consider an environment in which a UE is used. In this case, a purpose of scheduling may be limited to maximize a system-centered throughput or to ensure fairness, and QoE may not be individually ensured. More specifically, in the conventional scheduling method, there is a frequently occurring case in which a user expected to have a short data usage time cannot be distinguished, and thus a service cannot be provided preferentially to such a user. Since the users having the short data usage time sensitively respond to a slight increase in a delay, total QoE is rapidly decreased when a delay of such users is increased. Accordingly, there is a need for a scheduling scheme capable of recognizing context information of the users in a system and allocating a frequency resource preferentially to the users having the short data usage time.

SUMMARY

According to an aspect of the present invention, there is provided a method for determining whether a mobile communication network can access a wireless local area network (WLAN) of a user equipment (UE), for establishing a WLAN connection of the UE under the control of the mobile communication network when a congestion occurs, and for transmitting a traffic delivered to the UE in parallel through the mobile communication network and the WLAN.

Accordingly, an efficiency of a traffic load management of the mobile communication network can be increased, and quality of experience of (QoE) of a user can be ensured with respect to the mobile communication network by increasing a radio duration transfer rate of the user in a congestion context.

According to another aspect of the present invention, there is provided a scheduling method capable of scheduling a radio resource preferentially on a user expected to have a short data usage time and a user using a real-time service by using user context information acquired through sensing information of a UE and a service type in use.

According to an embodiment of the present invention, a resource can be allocated preferentially to users having a short data usage time while satisfying a delay requirement of a real-time service.

Accordingly, total QoE can be increased.

In addition, an embodiment of the present invention provides a method capable of predicting a data usage time of a user and controlling radio resource scheduling based thereon.

According to an aspect of the present invention, a method of transmitting/receiving data of a UE having a sensor is provided. The method includes: sensing a state of the UE via the sensor in a communication idle mode; computing a weight regarding a UE usage of a user on the basis of a sensed sensing value; transmitting the weight and channel information for a communication channel to a communication network if the communication idle mode is changed to a communication active mode; and transmitting/receiving data according to radio resource scheduling configured in the communication network.

According to an aspect of the present invention, a method of receiving data of a UE is provided. The method includes: sensing a current location for each specific period, and determining whether the sensed location is included in a specific upper usage-frequency location range; transmitting, through a communication network, information regarding whether the sensed location is included in the upper usage-frequency location range or whether the UE is being charged; upon reception of a wireless local area network (WLAN) access instruction from the communication network, accessing an accessible WLAN; transmitting an Internet protocol (IP) address for the WLAN through the communication network; receiving data in parallel from the communication network and the WLAN; and adjusting data received from the communication network and data received through the WLAN on the basis of information included in an IP header and transmission control protocol (TCP) header of the data.

BRIEF DESCRIPTION OF THE DRAWINGS

FIG. 7 is a table showing that a current UE location is sensed according to an embodiment of the present invention.

FIG. 8 is a table showing a usage-frequency rank list based on a sensed location according to an embodiment of the present invention.

FIG. 12 shows an Internet protocol (IP) header of an IP packet.

DESCRIPTION OF EXEMPLARY EMBODIMENTS

Figure 1:
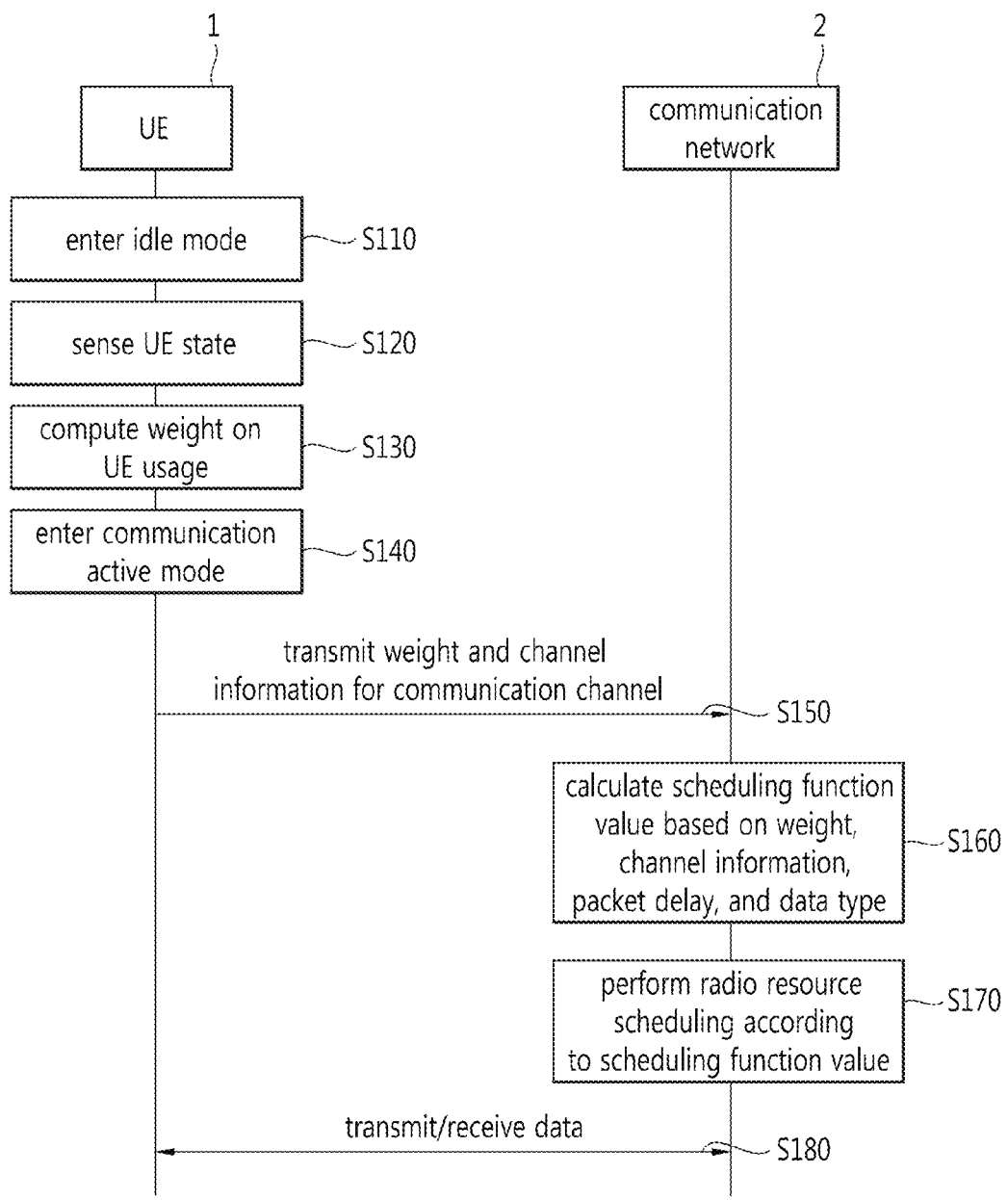
FIG. 1 is a flowchart for explaining a scheduling method using context information of a user equipment (UE) according to an embodiment of the present invention.

Surrounding environments of users have an effect on quality of service (QoS) of communication. For example, in a context in which a portable terminal such as a smart phone can be used freely, there is a tendency that an average data usage time of the user is long and a change in a sensing value of a user equipment (UE) is great. If the user grabs the UE while using it, a gyro sensing value of the UE may be changed persistently. In particular, the gyro sensing value is changed if a UE located in a specific place is raised to be used, and an amount of light entering to an illumination sensor located in a front side of the UE and a sound level measured through a microphone of the UE are changed frequently according to a movement of the UE.

On the other hand, when the user concentrates on a specific task, it is expected that the sensing value of the UE is not significantly changed. For example, in case of an office hour or a school hour, a change in an illumination of the UE and a sound sensing value is small, and the UE moves less frequently. In addition, in a case where the user performs a specific task in a movie theater, an office, etc., a usage time of the UE is short. Users having a short data usage time more sensitively respond to a delay which occurs during a given usage time. This is because the service usage time is short and thus a ratio of a delay against the usage time is great.

Conventionally, when a congestion occurs in a communication network, scheduling is performed without having to distinguish a user having a long data usage time and a user having a short data usage time. In this case, the number of users who receive a service during a specific time is decreased if the scheduling is performed preferentially to users having a long data usage time. In order to provide a service to as many users as possible when a limited radio frequency resource is utilized and thus a network congestion occurs, it is necessary to identify users having a short data usage time and allocate the radio frequency resource preferentially to the identified users.

Meanwhile, the conventional scheduling method considering a service type, that is, a data type or a data class, does not consider user context information in many cases. Optionally, there may be a context in which a user of a non real-time service more sensitively responds to a delay than a user of a real-time service, e.g., an online game service. For example, there is a high possibility that users having a very short data usage time are sensitive to a data delay as described above. Accordingly, there is a need for a scheduling method capable of increasing quality of experience (QoE) of users having a short data usage time while ensuring a delay requirement of users of a real-time service.

In order to satisfy a delay requirement of the users using the real-time service while allocating a frequency resource preferentially to the users having the short data usage time, a data usage time is predicted by using user context information, and scheduling is performed on the basis of service information used by the user, that is, data type information.

According to one aspect of the present invention, in order to maximize total QoE by utilizing a limited radio frequency resource, user context information is predicted by using UE's sensor information and service type, and scheduling is performed preferentially on a user more sensitive to a delay (i.e., a user having a short data usage time or using a real-time service).

For this, the present invention calculates a scheduling weight by using UE's sensor information, and determines a different weight according to a delay budget based on a service type. Total QoE can be increased by scheduling a radio frequency resource according to a scheduling weight value given to each user.

Hereinafter, it is described a method of recognizing a user context by using UE's sensing information and of performing scheduling in response thereto.

FIG. 1 is a flowchart for explaining a scheduling method using context information of a UE according to an embodiment of the present invention.

As illustrated, a UE 1 may transmit a weight considering a user context through communication with a communication network 2, and the communication network 2 may perform radio resource scheduling for the UE 1 in response thereto.

The UE 1 may include all electronic devices (e.g., a mobile phone, a tablet PC, etc.) capable of transmitting/receiving data while communicating with the communication network 2. The communication network 2 may be implemented with an eNodeB or a radio access network for controlling a cell of the UE 1.

When the UE 1 enters a communication idle mode (step S110), sensors not included in the UE 1 may sense a UE state (step S120).

The communication idle mode according to the present invention may imply a state in which a user does not communicate with the communication network 2 and thus data transmission/reception is not generated, that is, a mode in which a control channel does not exist between the communication network 2 and the UE 1.

The UE 1 may include a plurality of sensors (not shown) capable of sensing the UE state. According to an embodiment of the present invention, the UE 1 may include an illumination sensor, a sound sensor, or a gyro sensor. Of course, the UE 1 may further include an additional sensor for sensing the UE state. For example, the UE 1 may further include a sensor for sensing whether a battery is being charged.

Meanwhile, since a weight to be described below is computed on the basis of a sensed sensing value, information regarding sensing ability of the UE 1 may be reported in advance to the communication network 2.

If the UE state is sensed, on the basis of the sensed sensing value, the UE 1 may compute a weight regarding a UE usage of a user, more specifically, a scheduling weight which may be used in radio resource scheduling (step S130).

The weight may be computed through a process of normalizing a reciprocal of dispersion for a sensing value for each specific period.

Figure 2:
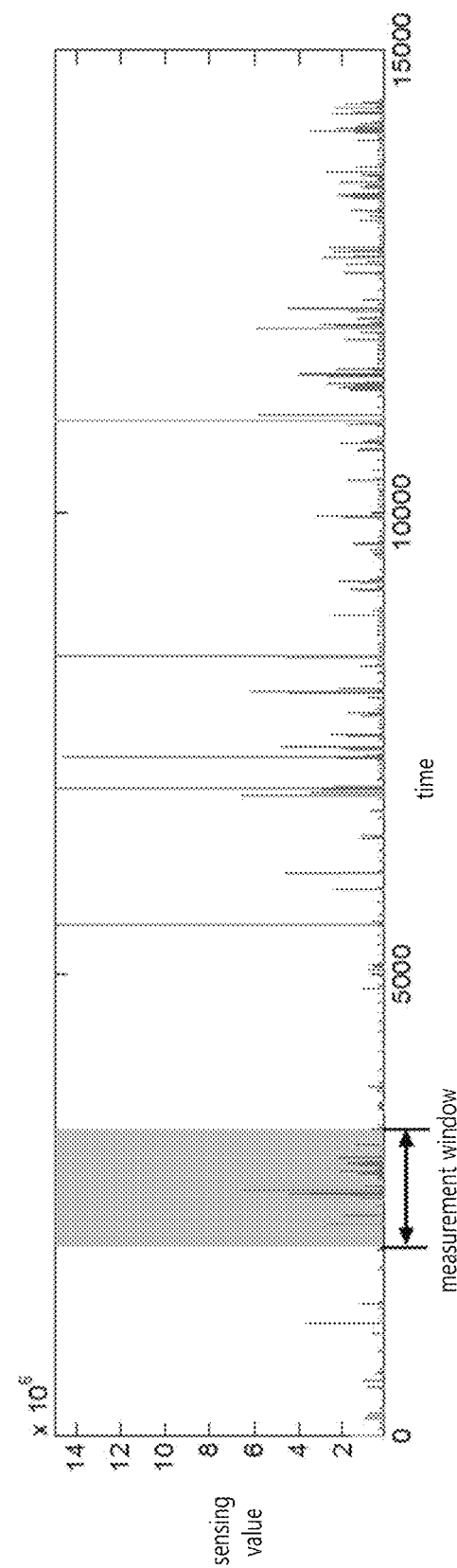
FIG. 2 shows an operation of computing a dispersion of a sensing value according to an embodiment of the present invention.

FIG. 2 shows an operation of computing a dispersion of a sensing value according to an embodiment of the present invention. As shown in FIG. 2, every hour, each of sensors may sense an illumination, a sound volume, and a UE movement level on a real-time basis. The dispersion of the sensing value may be calculated while a prediction window moves with a measurement time period. A size of the prediction window may be predetermined, or information regarding the size may be received from the communication network 2.

If the UE 1 moves less frequently and a surrounding context (i.e., an amount of light measured by a sensor and a noise level) is changed in a small range, there is a high possibility that a user is not using the UE but is concentrating on something else. During an office hour or a school hour, since the user is concentrating on a specific task other than the UE, a sensing value may not be changed significantly. When the user is concentrating on a specific task, a usage frequency of the UE 1 is decreased and thus a data traffic usage time is also decreased. Accordingly, the data traffic usage time of the user can be predicted if user's context information is known by using the sensing value.

On the other hand, in a context in which the UE 1 can be used freely, there is a tendency that an average data usage time of the user is long and a change in a sensing value of the UE 1 is great. For example, a gyro sensing value is changed if the user freely uses the UE 1, and an amount of light entering to an illumination sensor located in a front side of the UE and a sound level measured through a microphone of the UE 1 are changed frequently according to a movement of the UE.

A user having a short data traffic usage time is more sensitive to an average packet delay, and thus a weight of users having a small dispersion of a sensing value is calculated to a great value. That is, the weight indicates to what extent the user is more sensitive to a packet delay since the user is not concentrating on the UE 1, and may be computed as shown in Equation 1.

$$\alpha = v_{light} \cdot v_{sound} \cdot v_{gyro} \qquad <\text{Equation 1}>$$

$v_{light}$, $v_{sound}$, $v_{gyro}$ are values obtained by normalizing a reciprocal of dispersion for respective sensor values, where $\alpha$ has a value in the range of 0 to 1.

A weight of users expected to have a short data usage time since a dispersion of a sensing value is small is calculated to be a high value, and a weight of users expected to have a long data usage time since a dispersion is great is calculated to be a relatively low value. That is, the shorter the data usage time of the user, the greater the value of the weight.

Figure 3:
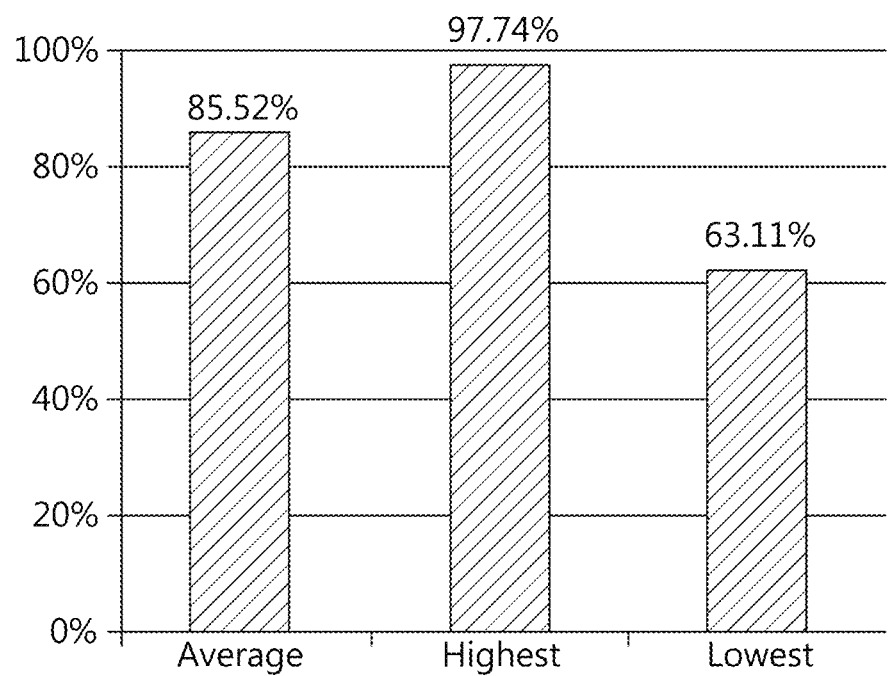
FIG. 3 is a graph showing a result of predicting a user context based on a user weight according to an embodiment of the present invention.

FIG. 3 is a graph showing a result of predicting a user context based on a user weight according to an embodiment of the present invention. As illustrated, as a result of predicting an actual user context based on a weight of a user according to the present embodiment, it shows that a prediction possibility is high up to 97.74% and a success rate is at least about 85.52% on average.

According to another embodiment of the present invention, if the UE 1 does not include a sensor such as an illumination sensor, a sound sensor, or a gyro sensor, an average value of a scheduling weight of another user may be applied for a scheduling weight of the UE 1. In this case, the UE 1 may acquire scheduling weight information through communication with other UEs, and may use weight information stored by being received previously from the communication network 2.

While such sensing and a computation on the weight are achieved, if the communication idle mode is changed to a communication active mode (step S140), the UE 1 may transmit the weight and channel information for the communication channel to the communication network (step S150).

A case where the communication idle mode is changed to the communication active mode in the present invention may include a case where an RRC idle mode is changed to an RRC connected mode or a case where a UE mobility idle mode is changed to an EPS mobility management (EMM)-Registered mode.

The UE 1 and the communication network 2 may transmit/receive control information related to a radio access through an RRC layer.

The UE 1 in the idle mode needs to perform a connection procedure for establishing an RRC connection to start a circuit service call or a packet service call. If a control channel is established between the UE 1 and the communication network 2 through the RRC connection procedure, control information for a cell establishment or the like between the UE 1 and the communication network 2 may be transmitted/received through the control channel, a radio bearer for data transmission may be configured, and data may be transmitted/received through the radio bearer.

The EMM implies a mobility management performed in a network such as an evolved packet system (EPS). When in the EMM-Registered state, a kind of paging may be broadcast to the UE 1 in the idle state from the communication network 2. After the paging is broadcast, the UE 1 in the idle state may be changed to a connected state in which a resource can be allocated by accessing a corresponding network and data can be received.

As such, if a channel is formed between the UE 1 and the communication network 2 and thus the UE 1 enters a communication active mode in which data communication is possible, information on a weight may be transmitted to the communication network 2.

Alternatively, according to another embodiment of the present invention, when an uplink scheduling request is generated to the communication network 2 or when a data downlink is generated from the communication network 2, that is, when a page download is generated, the communication idle mode may be changed to the communication active mode.

That is, since the present invention performs scheduling by considering a data packet delay according to a user's data usage time availability, information on a weight is necessary when data transmission/reception is possible or when data transmission/reception is required.

Accordingly, the UE 1 delivers the weight to the communication network 2 if data transmission/reception is required, and allows effective scheduling to be performed in response thereto.

Channel information transmitted by the UE 1 to the communication network 2 may include an instantaneous transmittable rate. The instantaneous transmittable rate may be information indicating a communication state of a current channel.

During a context of the UE 1 is reported and scheduling is performed according to FIG. 1, that is, even if the UE 1 is changed from the communication idle mode to the communication active mode, the UE 1 continuously senses a UE state, and computes a weight on the basis of a sensing value.

Upon reception of the weight and channel information from the UE 1, the communication network 2 may compute a scheduling function value on the basis of the weight, channel information indicating an instantaneous transmittable rate, the packet delay of the UE, and the data type (step S160).

Users having a high weight have a short data traffic usage time, and thus QoS cannot be provided by a requested amount. Therefore, even if QoE is decreased, a time for compensating this is not sufficient. That is, the QoE is increased when an average delay per packet is low with respect to a service usage time. Accordingly, in order to increase total QoE, a frequency resource must be allocated by giving a priority not only to a user of a real-time service but also to users having a high weight.

The scheduling function value may be computed by Equation 2 below.

$$F_i(t) = \begin{cases} \alpha_i \dfrac{R_i(t)}{S_i(t-1)}, & Q_i(t) \leq \tau \\ \dfrac{R_i(t)}{S_i(t-1)}, & Q_i(t) > \tau \end{cases} \quad \langle \text{Equation 2} \rangle$$

$\alpha$ is a weight received from the user, and $\alpha_i$ denotes a context weight for a user $i$. $\alpha$ has a value in the range of 0 to 1.

$R_i(t)$ denotes an instantaneous transmittable rate at a time $t$ for a user $i$, $S_i(t)$ denotes an average packet throughput at the time $t$ for the user $i$, $Q_i(t)$ denotes a delay budget at the time $t$ for the user $i$, that is, a packet delay, and $\tau$ denotes a delay budget based on a data type.

The communication network 2 may calculate a scheduling function value $F_i(t)$ on the basis of the weight $\alpha_i$ of all users on a network, the channel information $R_i(t)$, the throughput $S_i(t)$ of a current time, and the packet queuing delay $Q_i(t)$, and may allocate a radio resource preferentially to a user whose scheduling function value $F_i(t)$ is greatest by considering the scheduling function value $F_i(t)$. That is, the radio resource is allocated preferentially when the scheduling function value is increased.

The shorter the user's data usage time, the greater the weight. The greater the weight, the higher the scheduling function value.

Regarding a condition of computing the scheduling function value, if the packet delay $Q_i(t)$ of the UE is less than a specific threshold $\tau$, the scheduling function value is increased in proportion to a product of the weight $\alpha_i$ and the channel information $S_i(t)$.

That is, the weight $\alpha_i$ is applied to $S_i(t)$ indicating channel information of the user, and thus a user whose weight $\alpha_i$ is low does not have a priority in scheduling in comparison with a user whose weight $\alpha_i$ is high by decreasing an actual value $S_i(t)$. If a maximum value of the weight is not 1, a user's data usage time is short and thus a scheduling function value of a user who may be sensitive to a packet delay is computed to be a greater value, and a radio resource is allocated preferentially to the user.

On the other hand, if the packet delay $Q_i(t)$ of the UE is greater than the specific threshold $\tau$, the weight $\alpha_i$ is set to 1 and thus has a highest priority in scheduling.

The threshold $\tau$ may be determined on the basis of a data type, that is, a type of a service or application which is currently provided. If the data type is real-time service data, the threshold $\tau$ may be determined to be smaller than a case where the data type is non real-time service data.

In case of the real-time service data such as an online game or video stream downloading, the threshold is determined to be a small value and thus there is a high possibility that the weight αi is set to 1. If the weight αi is set to 1, the highest priority may be given to scheduling.

As such, the communication network 2 according to the present invention predicts a user's data usage time to allocate a radio resource preferentially to a user sensitive to a delay, and considers a data type used by the user. Accordingly, total QoE can be increased by allocating a radio resource preferentially to a user for which a scheduling function value is computed to be a great value.

When the scheduling function value is computed, the communication network 2 performs radio resource scheduling (step S170) for the UE on the basis of the scheduling function value. The UE 1 and the communication network 2 transmit/receive data according to radio resource scheduling configured in the communication network 2 (step S180).

Figure 4:
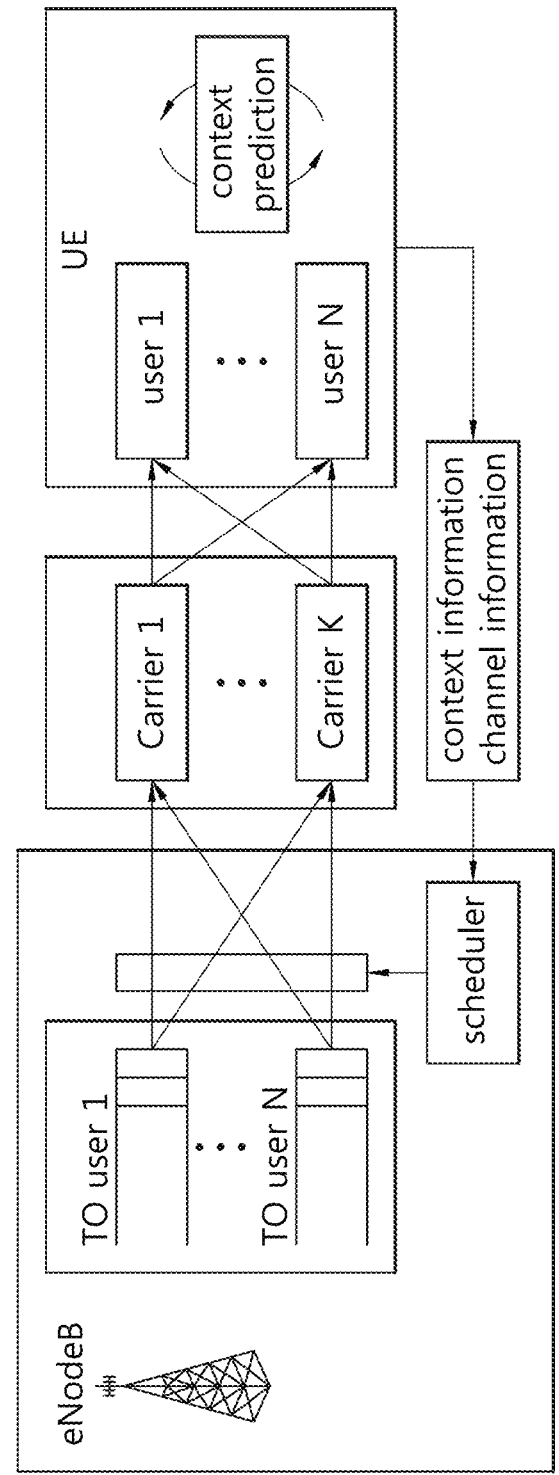
FIG. 4 is a schematic view showing scheduling of a communication network according to an embodiment of the present invention.

FIG. 4 is a schematic view showing scheduling of a communication network according to an embodiment of the present invention.

As illustrated, an eNodeB which performs data transmission/reception and scheduling as a part of the communication network performs scheduling on a plurality of users (i.e., a user 1, . . . , a user N) on the basis of context information and channel information received from a UE.

For this, the UE performs a context prediction, and provides a scheduler with context information regarding the predicted context.

Figure 5:
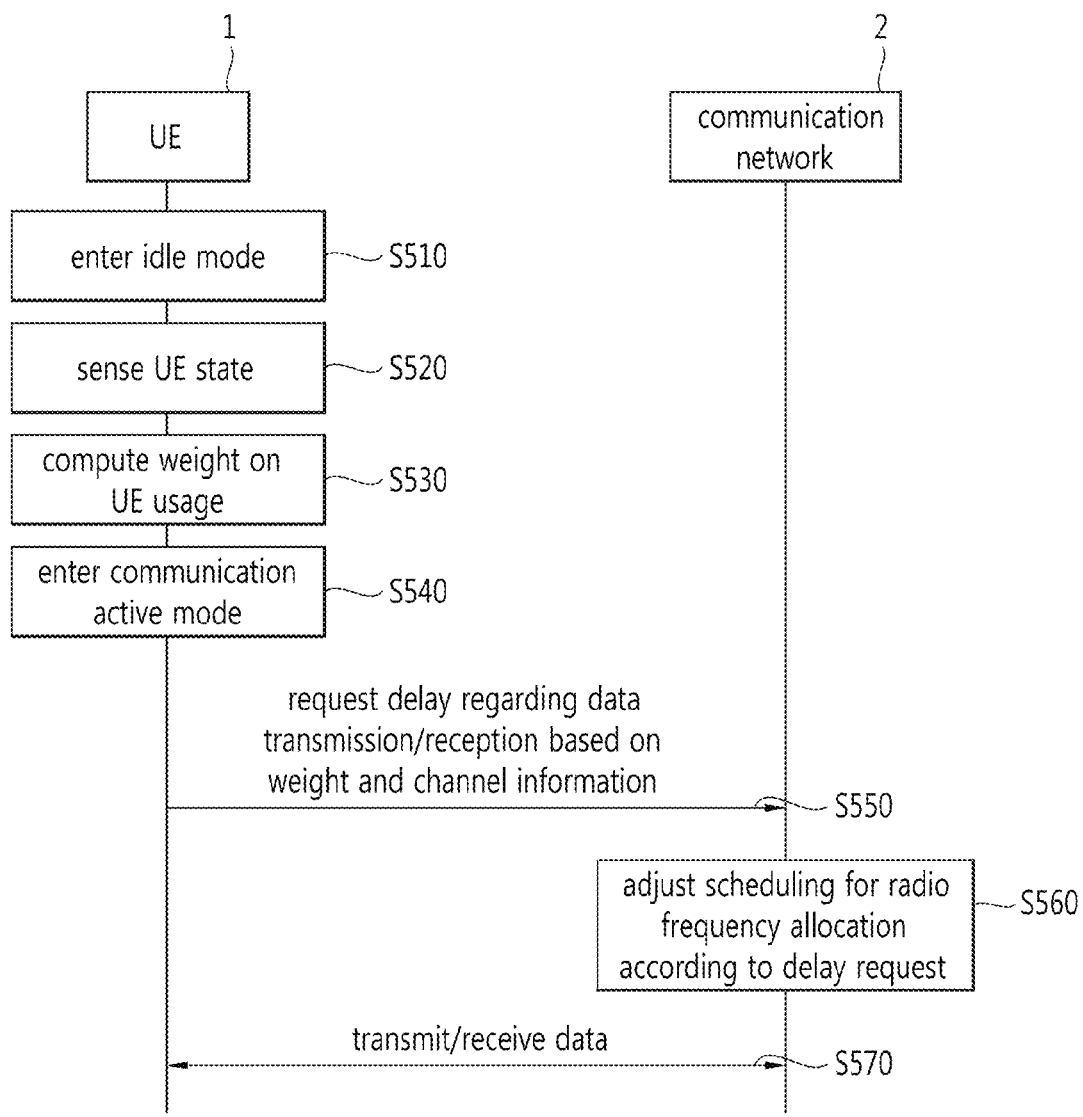
FIG. 5 is a flowchart for explaining a scheduling method using context information of a UE according to another embodiment of the present invention.

FIG. 5 is a flowchart for explaining a scheduling method using context information of a UE according to another embodiment of the present invention.

Another scheduling method according to the present embodiment may predict context information and report this to the communication network, similarly to the UE of FIG. 1.

That is, when a UE 1 enters a communication idle mode (step S510), sensors not included in the UE 1 may sense a UE state (step S520).

Thereafter, the UE 1 may compute a scheduling weight which may be used in radio resource scheduling on the basis of a sensed sensing value (step S530).

If the communication idle mode is changed to a communication active mode (step S540), the UE 1 according to the present invention may request a communication network 2 to delay data transmission/reception on the basis of the computed weight and channel information (step S550).

For example, if data transmission/reception or fast data transmission/reception is not necessary at present with respect to the UE 1, the UE 1 may transmit a delay request signal to the communication network 2. That is, although the UE 1 cannot directly control scheduling, it may have an effect on scheduling with the communication network 2 on the basis of its current data packet state or data delay context.

The communication network 2 adjusts scheduling for a radio frequency allocation according to such a delay request (step S560). The UE 1 and the communication network 2 transmit/receive data according to the adjusted radio resource scheduling (step S570).

Upon reception of a delay release request signal additionally from the UE 1, the communication network 2 may newly perform frequency scheduling in response thereto. If a specific time is over, scheduling may be re-adjusted by considering a delay level with respect to other UEs.

As described above, in one aspect of the present invention, the UE recognizes context information of a user by using its sensing value, and transmits information thereof to the communication network, so that an eNodeB recognizes a user who needs to be preferentially handled and allocates a frequency resource.

The conventional service-based scheduling algorithm which preferentially handles users using a real-time service cannot know whether to give a priority based on a context of a non real-time user. However, in case of the scheduling method according to the present invention, since a communication network allocates a radio resource by recognizing a user who needs to be handled preferentially among users using a non real-time service, total QoE can be increased, and the number of users who satisfy a QoE goal corresponding to a specific criterion can be increased.

Figure 6:
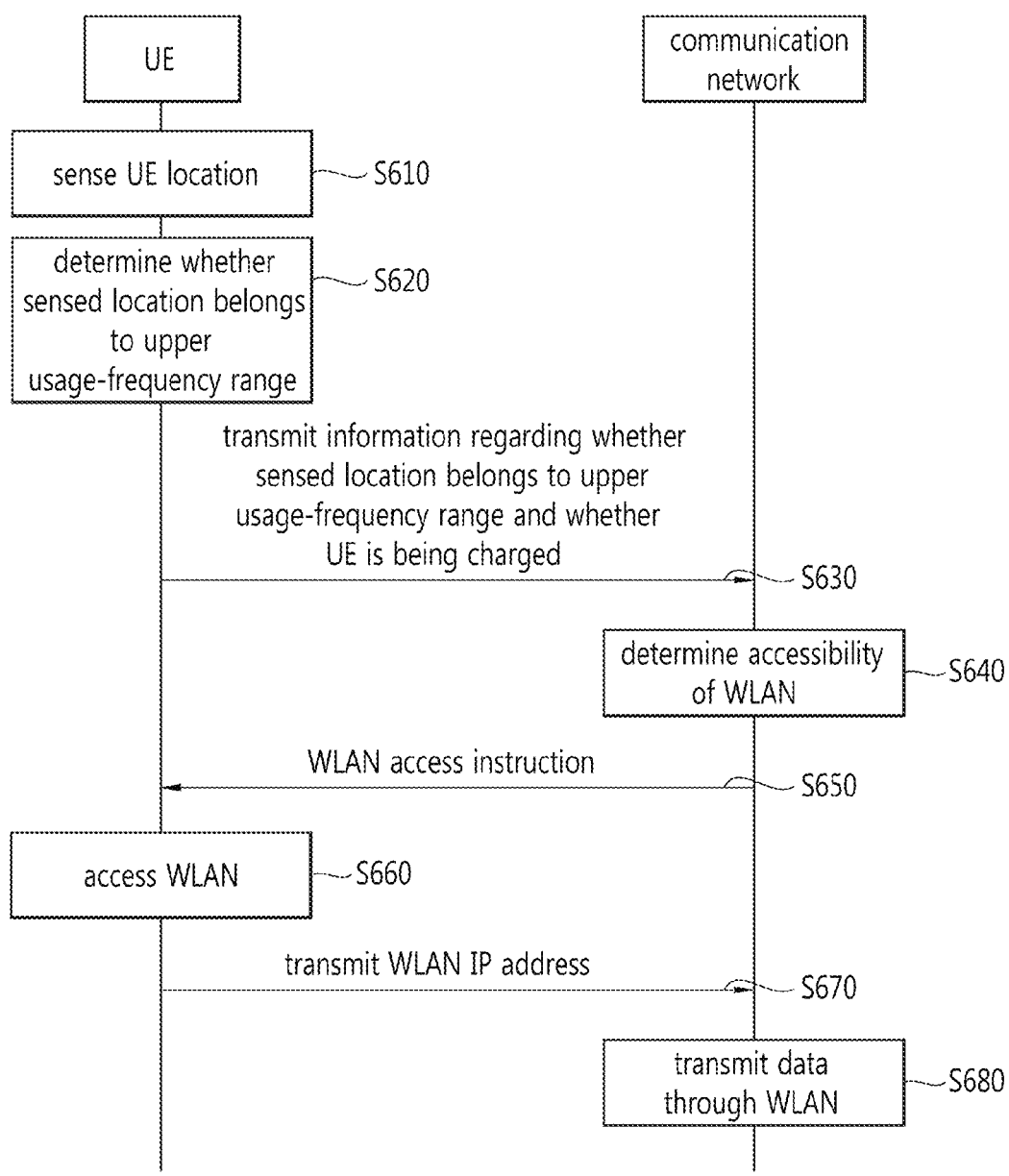
FIG. 6 is a flowchart for explaining data communication of a communication network with respect to a UE according to an embodiment of the present invention.

FIG. 6 is a flowchart for explaining data communication of a communication network with respect to a UE according to an aspect of the present invention. Referring to FIG. 6, a method of determining accessibility between the UE and a WLAN and transmitting data through an accessible WLAN is described.

The UE may include all electronic devices and mobile electronic devices (e.g., a mobile phone, a table PC, etc.) capable of transmitting/receiving data through a communication with respect to a communication network. The communication network may be implemented with an LTE network as a network for transmitting data to a UE having a mobility, and may be implemented with an eNodeB or a radio access network for controlling a cell of the UE capable of transmitting data through communication. For example, the communication network may be implemented with a cloud radio access network (C-RAN).

As illustrated, to begin with, the UE senses a current location with a specific period T1 (step S610). Location information may be recognized on the basis of a usage-frequency rank list in which the sensed current UE location and a previous UE location are stored.

FIG. 7 is a table showing that a current UE location is sensed according to an aspect of the present invention. FIG. 8 is a table showing a usage-frequency rank list based on a sensed location according to an embodiment of the present invention.

As shown in FIG. 7, a UE location is recorded every period T1 as a GPS value during a time period T0.

In addition, a usage-frequency rank list of FIG. 8 is also managed together with a location list. If the UE location is sensed several times in an overlapping manner, the corresponding location is placed in an upper position in the usage-frequency rank list of FIG. 8.

A location coordinate of the stored usage-frequency rank list stored in the table of FIG. 8 may indicate a coordinate of a WLAN accessible location. That is, the location coordinate of the usage-frequency rank list may be base data capable of tracing coordinates of locations at which the UE has accessed the WLAN.

Meanwhile, if the UE is located indoors, there may be a case where a GPS value is incorrect. Therefore, when a difference of sensed locations is within a specific range, it may be recognized that UEs are located in the same position. A usage frequency may be determined by repetitively calculating a result of Equation 3 below.

$$\operatorname*{argmax}_{i} \sum_{j \neq i} 1[\|location_i - location_j\| \leq \delta] \qquad \langle \text{Equation 3}\rangle$$

$i \in \{\text{List}\} - \{\text{Ranked}\}$ $j \in \{\text{List}\}$

In Equation 3, 'List' denotes a coordinate stored in a UE location list, and 'Ranked' denotes a coordinate included in a usage-frequency rank list among coordinates stored in the UE location list.

The UE may repetitively perform a decision based on Equation 3 to determine the rank list. If a distance between a sensed location of the UE and a coordinate included in the usage-frequency rank list is less than or equal to δ indicating a specific threshold, a coordinate of the sensed location may not be included in the rank list.

Location coordination values recorded as such may be recorded effectively during a time T0, and may be removed from the location list when the time T0 is over after being first recorded to the location list.

The UE determines whether the sensed location belongs to an upper usage-frequency location range (step S620). The usage-frequency location range implies a location belonging to a specific rank among pre-stored UE locations.

More specifically, the UE may recognize whether the sensed location is included in an upper third range according to Equation 4.

$$\left[\min_{i \in L} \|location_p - location_i\|\right] \le \delta \quad \langle \text{Equation 4} \rangle$$

In Equation 4, $location_p$ denotes a currently sensed location, and $L$ denotes a location at upper three places in the usage-frequency rank list.

Although not shown, the UE may sense whether the UE is currently being charged. Information regarding whether the UE is being charged may be used when the communication network predicts a location of the UE, and may be used to determine whether the UE has accessed the WLAN.

Thereafter, the UE transmits, to the communication network, information regarding whether the sensed location is included in the upper usage-frequency location range or whether the UE is being charged (step S630).

According to the present invention, the UE transmits, to the communication network, location information based on the sensed location or context information such as whether the UE is being charged. This corresponds to a method capable of determining whether to access the WLAN by using context information sensed by the UE, instead of the existing WLAN IP scanning method.

Upon reception of the context information capable of determining whether it has accessed the WLAN from the UE, the communication network may determine whether the UE can access the WLAN, that is, WLAN accessibility, on the basis of location information of the UE or information regarding whether the UE is being charged (step S640).

If the UE is located in a place frequently visited in the past or if a battery is currently being charged, the communication network may determine that there is a high possibility that an access is made through an alternative to a current mobile communication. That is, if the UE is currently within a usage-frequency rank range, for example, is located in a place within an upper third range, or if a battery of the UE is currently being charged, the communication network may determine that the UE can access the WLAN.

For example, in many cases, WiFi is installed in frequently visited places such as a school or a favorite cafe. In addition, there is a high possibility that WiFi or a wired computer is installed in such a place as a house or office in which the UE is often charged.

If it is determined that the UE can access the WLAN on the basis of context information, the communication network transmits a WLAN access instruction to the UE (step S650).

If the WLAN access instruction is received from the communication network, the UE accesses an accessible WLAN (step S660), and transmits an IP address for the WLAN to the communication network (step S670).

Upon reception of the IP address for the accessed WLAN from the UE, the communication network transmits data through the WLAN (step S680).

The UE according to the present embodiment may receive data in parallel through the existing communication network, that is, the mobile communication network and a newly connected WLAN.

The UE may adjust data received from the communication network and data received through the WLAN on the basis of information included in an IP header and TCP header of the data. A content regarding a data adjustment of the UE is described below in detail.

According to another embodiment of the present invention, a communication network may provide a UE with a WLAN access list of WLANs accessible by the UE, and the UE may access any one of WLANs included in the WLAN access list.

Figure 9:
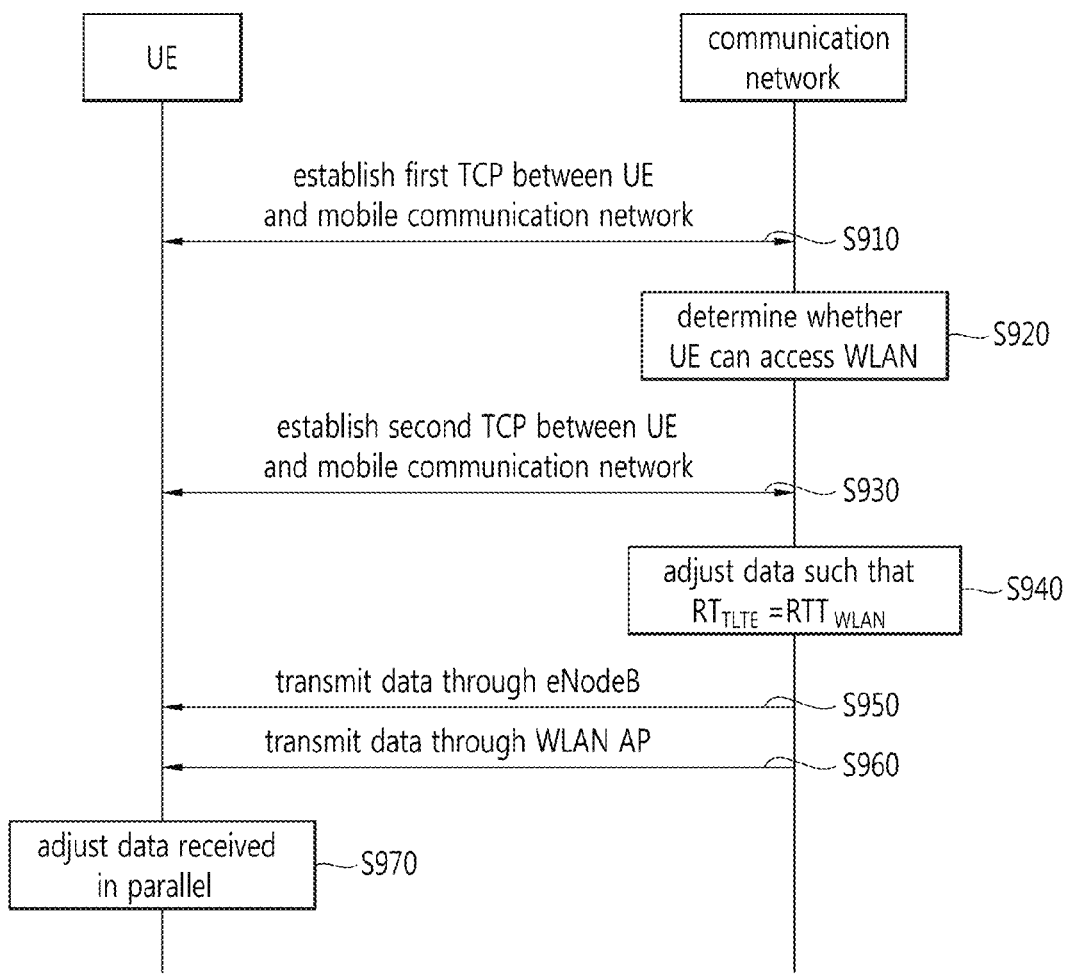
FIG. 9 is a flowchart for explaining data communication between a UE and a network according to another embodiment of the present invention.

FIG. 9 is a flowchart for explaining data communication between a UE and a network according to another embodiment of the present invention. A method of establishing two TCP connections to the UE and for transmitting data in parallel is described with reference to FIG. 9.

To begin with, a first TCP connection is established between the UE and the network, that is, a mobile communication network (step S910). This implies an end-to-end connection using the existing communication network.

Thereafter, the communication network may determine whether the UE can access the WLAN (step S920).

Step S920 may correspond to step S640 of FIG. 6. That is, although not shown, the communication network may receive from the UE a context capable of determining whether the UE can access the WLAN, and the UE may sense a location of the UE as shown in steps S610 to S630 of FIG. 6, and may transmit, to the communication network, information regarding whether the sensed location belongs to an upper usage-frequency location range or whether the UE is being charged.

If it is determined that the UE can access the WLAN, the communication network may transmit a WLAN access instruction to the UE. When the UE which receives the WLAN access instruction from the communication network accesses an accessible WLAN, a second TCP connection is established between the UE and the WLAN (step S930).

That is, according to the present invention, since a new second TCP is connected between the UE and a WLAN AP by adding to the end-to-end connection between the existing UE and the mobile communication network, data can be transmitted in parallel to the UE.

Figure 10:
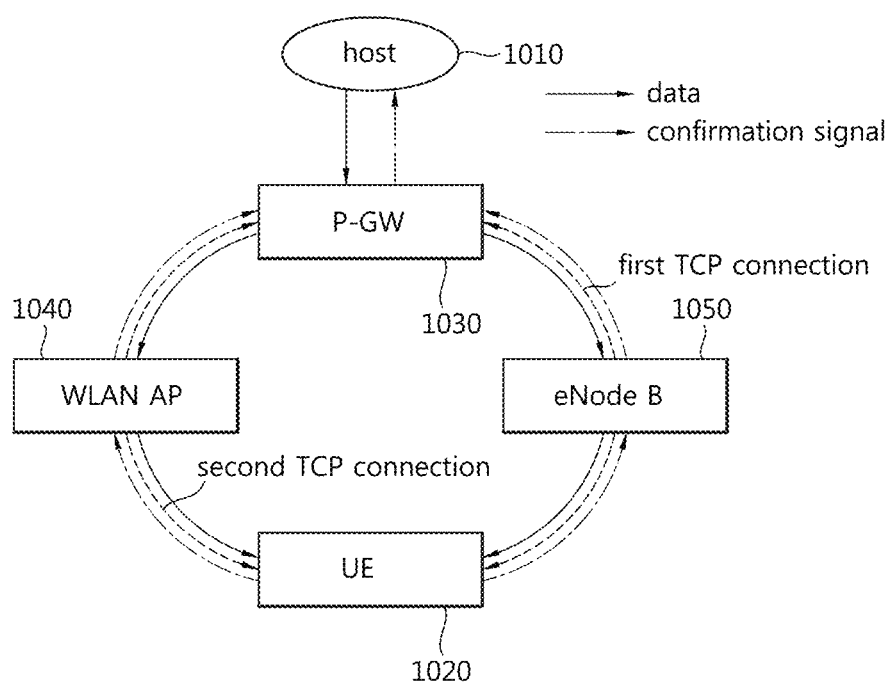
FIG. 10 is a schematic view showing structures for explaining a data transmission method of FIG. 9.

FIG. 10 is a schematic view showing structures for explaining a data transmission method of FIG. 9. As shown in FIG. 10, data provided from a host 1010 may be distributed to a UE 1020 via a packet data network gate way (P-GW) 1030. The P-GW 1030 is a node corresponding to a gateway GPRS support node (GGSN) of 3G. As a point of contact at which a data traffic enters an IP multimedia subsystem (IMS) in LTE, the P-GW 1030 serves for anchoring a UE movement between LTE and a non-3GPP network.

The P-GW 1030, an S-GW (not shown), and an eNodeB 650 create a first data transfer path for transmitting data to the UE 1020 on the basis of a first TCP. The P-GW 1030 and a WLAN AP 1040 create a second data transfer path for transmitting data to the UE 1020 on the basis of a second TCP. That is, data provided from the host 1010 is transmitted in parallel to the UE 1020 via the two data paths.

Upon reception of data, the UE 1020 outputs a confirmation signal (i.e., ACK) for confirming a reception of transmitted data. Such a confirmation signal is also transmitted to the P-GW 1030 via the two data paths. The confirmation signal transmitted to the P-GW 1030 may be transmitted to the host 1010 to adjust a speed and traffic for providing data.

If a congestion of a mobile communication network is lower than a congestion of a WLAN, parallel transmission of data through the WLAN may cause a longer delay time. Therefore, in such a case, only when a small amount of data is transmitted through the WLAN and most of data is transmitted through the mobile communication network, a total delay time generated when the UE 1020 receives data can be decreased.

On the contrary, if the congestion of the mobile communication network is high, data transmission through the WLAN may have a shorter delay time. Therefore, a greater amount of data is transmitted through the WLAN, and a small amount of data is partially transmitted through the mobile communication network.

That is, data to be delivered to the UE 1020 can be transmitted effectively in a divisive manner only when the congestion of the mobile communication network and the congestion of the WLAN are recognized. The congestion may be recognized indirectly by comparing a round trip time (RTT) of a path through the mobile communication network and a path through the WLAN.

According to the present invention, a control for a parallel transmission of such data, that is, a data distribution through a congestion control, may be achieved by the P-GW 1030, and the P-GW 1030 adjusts data such that an RTT becomes identical between the path through the mobile communication network and the path through the WLAN (step S940).

Figure 11:
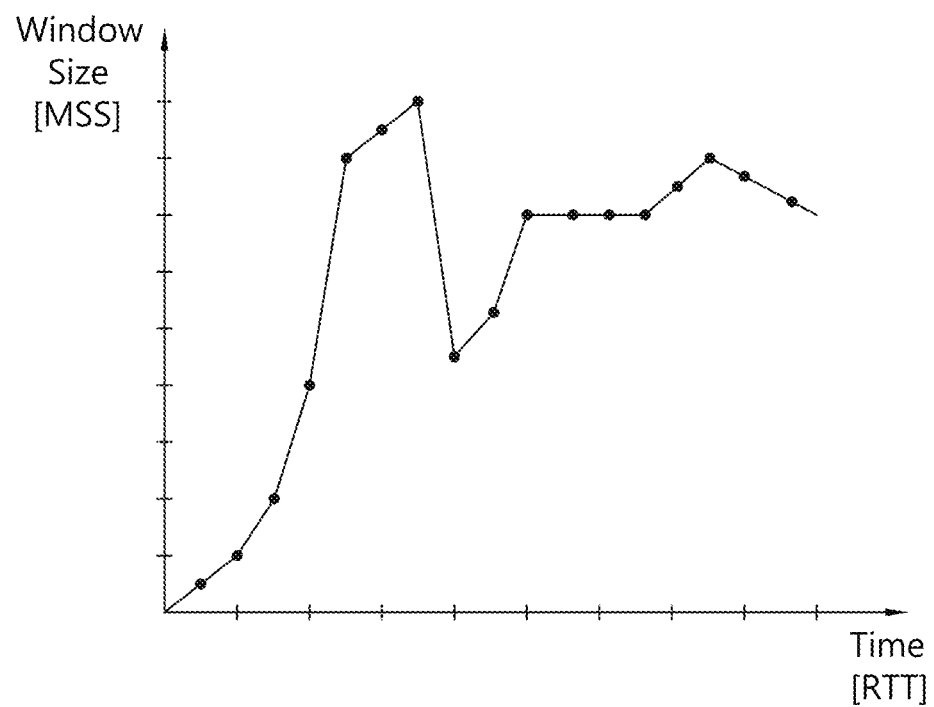
FIG. 11 shows a change in a transmission control protocol (TCP) congestion window according to an embodiment of the present invention.

FIG. 11 shows a change in a TCP congestion window, more specifically, a second TCP congestion window according to an embodiment of the present invention. If the second TCP congestion window is increased in size, an amount of data transmitted to the UE 1020 through a WLAN is increased.

The P-GW 1030 increases the congestion window size if it is determined that a context of the WLAN can cope with an additional transfer rate, and decreases the congestion window size if there is a data loss, that is, a packet loss. Thereafter, if it is determined that it is difficult for the WLAN to cope with the additional transfer rate while increasing again the congestion window size, the congestion window size is fixed.

In addition, if an RTT of a mobile communication network is less than an RTT of a WLAN, the P-GW 1030 may decrease a window size linearly so that a ratio of a packet transmitted through the WLAN is decreased. Such a change in the congestion window size may be determined according to two secondary windows (i.e., a loss-based window and an RTT-based window).

Among the secondary windows, the size of the loss-based window may be controlled on the basis of Equation 5 below.

$$\begin{cases} wnd_{t-RTT} = wnd_t + 1 & \text{for } ACK \\ wnd_{t-RTT} = (1-\beta)wnd_t & \text{for loss} \end{cases} \qquad \langle\text{Equation 5}\rangle$$

In Equation 5, $wnd_t$ denotes a loss-based window size at a time t.

The P-GW 1030 increases linearly the loss-based window size if a confirmation signal is arrived from the UE 1020 to indicate that a packet is correctly received, and decreases the loss-based window size if a loss occurs, that is, if the confirmation signal is not received.

Meanwhile, among the secondary windows, the RTT-based window may be controlled by Equation 6 and Equation 7.

$$awnd_{t-RTT} = awnd_t + \qquad\qquad \langle\text{Equation 6}\rangle$$
$$k \cdot cwnd_t^\alpha \text{ for } ACK\left(\text{if } RTT_{WLAN} < \gamma \ \& \ \frac{RTT_{WLAN}}{RTT_{LTE}} < 1\right)$$

In Equation 6, $awnd_t$ denotes an RTT-based window size at a time t, $cwnd_t$ denotes a congestion window size at the time t, and $\gamma$ denotes a threshold of an RTT. The RTT-based window size may be increased according to Equation 6.

According to Equation 6, a size of an RTT-based window is increased if an RTT of data transmitted through the WLAN is less than a predetermined threshold and an RTT of data transmitted through the mobile communication network and if a confirmation signal is received from the UE with respect to the data transmitted through the WLAN. That is, if it is determined that a packet to be delivered to the mobile communication network can be transmitted additionally through the WLAN since a current WLAN congestion level is low, the P-GW 1030 may increase the size of the RTT-based window. The increase in the size of the RTT-based window causes an increase in the size of the second TCP congestion window.

Meanwhile, among the secondary windows, the RTT-based window may be decreased in size according to Equation 7.

$$\begin{cases} awnd_{t-RTT} = (awnd_t - \rho_1)^- & \text{for } ACK \ (\text{if } RTT_{WLAN} \geq \gamma) \\ awnd_{t-RTT} = awnd_t - \rho_2 \frac{RTT_{WLAN}}{RTT_{LTE}} & \text{for } ACK \ \left(\text{if } \frac{RTT_{WLAN}}{RTT_{LTE}} \geq 1\right) \\ awnd_{t-RTT} = 0 & \text{for loss} \end{cases} \qquad \langle\text{Equation 7}\rangle$$

Referring to Equation 7, the P-GW 1030 decreases the RTT-based window size if an RTT of data transmitted through the WLAN is greater than a predetermined threshold or greater than an RTT of data transmitted through the mobile communication network and if a confirmation signal is received from the UE with respect to the data transmitted through the WLAN. The RTT-based window size may be decreased in proportion to an RTT ratio of both sides, and the decrease in the RTT-based window size causes a decrease in the size of the second TCP congestion window.

At last, if a packet loss occurs, the P-GW 1030 may set the RTT-based window size to 0.

The second TCP congestion window may be finally determined by summing two secondary window sizes as shown in Equation 8.

$$cwnd_t = wnd_t + awnd_t \qquad <\text{Equation 8}>$$

In summary, the P-GW 1030 may adjust a TCP congestion window size as to the WLAN by using an RTT of a packet transmitted through the mobile communication network and an RTT of a packet transmitted through the WLAN. Accordingly, an amount of a packet to be transmitted to the mobile communication network and an amount of a packet to be transmitted through the WLAN may be adjusted adaptively according to a network context.

Returning to FIG. 9, data is transmitted to the UE in parallel through a second TCP congestion window adjustment or through the WLAN AP 1040 and the eNodeB 1050 (steps S950 and S960).

The UE which receives data from the WLAN AP 1040 and the mobile communication network such as the eNodeB 1050 may adjust data received in parallel (step S970).

The UE may determine data received through different paths as data transmitted from the same flow, that is, from the same host 1010, and may read the data by adjusting a sequence of data.

Data transmitted/received from an IP network is transmitted in an IP packet format. Each IP packet includes a header area including information packet information.

FIG. 12 shows an IP header of an IP packet.

If data is received through a mobile communication network and a WLAN, that is, through different paths, "destination IP addresses" included in the IP header of the data have different values.

However, in a case where it is one data flow even if the paths are different, a source IP address and identification included in the IP header have the same value.

Accordingly, a network layer of a UE may recognize that received data is transmitted from the same host according to whether the source IP address and identification included in the same IP header have the same value.

If it is recognized that data received through a plurality of paths is the same flow, the network layer re-assembles data by using fragment offset information for indicating a location of total data pieces when split data pieces are assembled into one data piece.

After the data is re-assembled, the network layer delivers data of a normally received IP packet to a transport layer, and compares source IP information of the IP header and information included in the TCP header to recognize that data is transmitted from a single host.

Figure 13:
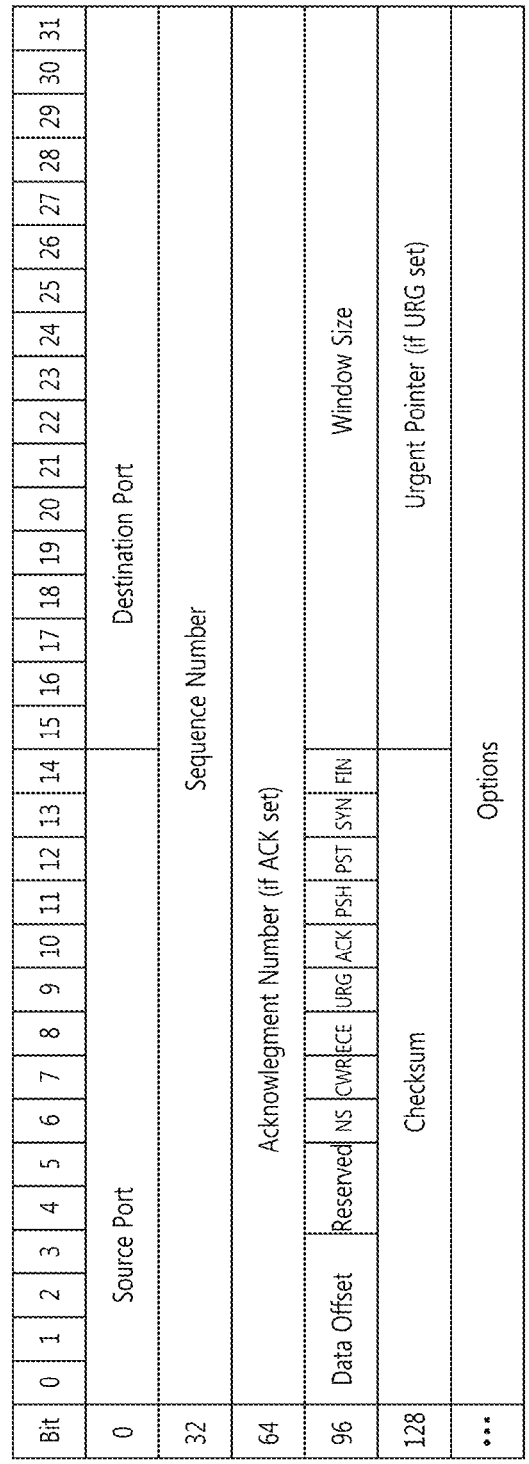
FIG. 13 shows a TCP header of an IP packet.

FIG. 13 shows a TCP header of an IP packet.

If a TCP connection between a UE and a WLAN is established as shown in the present embodiment, that is, if a TCP protocol is used in a transport layer, the TCP header is included in the IP packet as illustrated.

The transport layer may determine whether a source IP address and a source port and destination port included in the TCP header have the same value, and if the source IP address, the source port, and the destination port have the same value, may recognize that data is generated from a single data flow.

If a network layer and the transport layer recognize that data is received through a parallel path but is generated from the same flow, the data is sorted and read on the basis of a sequence number included in the TCP header.

In summary, the UE may recognize data received in parallel through the mobile communication network and the WLAN as a single data flow through information of the IP header and the TCP header, and may assemble the data according to the sequence number.

As described above, according to the present invention, if the UE is located in a place frequently visited in the past or if a battery is being charged, a communication network may determine that the UE can access a WLAN.

The communication network may instruct the UE which can access the WLAN to access the WLAN if necessary, and the UE may transmit an allocated IP address to the communication network after accessing the WLAN.

A P-GW which is an entity of parallel data transmission may generate a new TCP connection using the WLAN, and may control a data transfer rate through the WLAN by adjusting a congestion window size of the TCP connection. While controlling the data transfer rate through the WLAN, data is transmitted in a divisive manner by using a plurality of paths, that is, the mobile communication network and the WLAN.

The UE may recognize data received in parallel through the mobile communication network and the WLAN as a single data flow through information of the IP header and the TCP header, and may assemble the data.

Meanwhile, the conventional location information-based context prediction algorithm has a disadvantage in that context information cannot be accurately predicted in a sense that a user may have various contexts even in the same place. However, as described above, a user context prediction method proposed in the present invention can predict the user context more accurately by using a sensor value of a UE which is closest in distance to a user.

In addition, the conventionally proposed sensor information-based context prediction algorithm pre-processes an excessive amount of non-processed data and thus causes additional processing power, memory, and battery consumption for a computational process of the UE. Although detailed context information can be acquired in this case, there may be a problem of an overload of the UE and a decrease in a battery life. In addition, the conventional sensor information-based context prediction techniques are simply aiming at accurate recognition on a user surrounding environment, instead of aiming at prediction of a data traffic usage of a user.

Hereinafter, it is described a context information prediction method related to a user's data traffic usage pattern other than a simple surrounding environment recognition in order to increase QoE of a UE. That is, it is described a method of reporting user context information by using sensing information of a UE and a method in which a mobile communication network predicts various user contexts through sensor information of the UE of a user and uses it in data transmission/reception.

Figure 14:
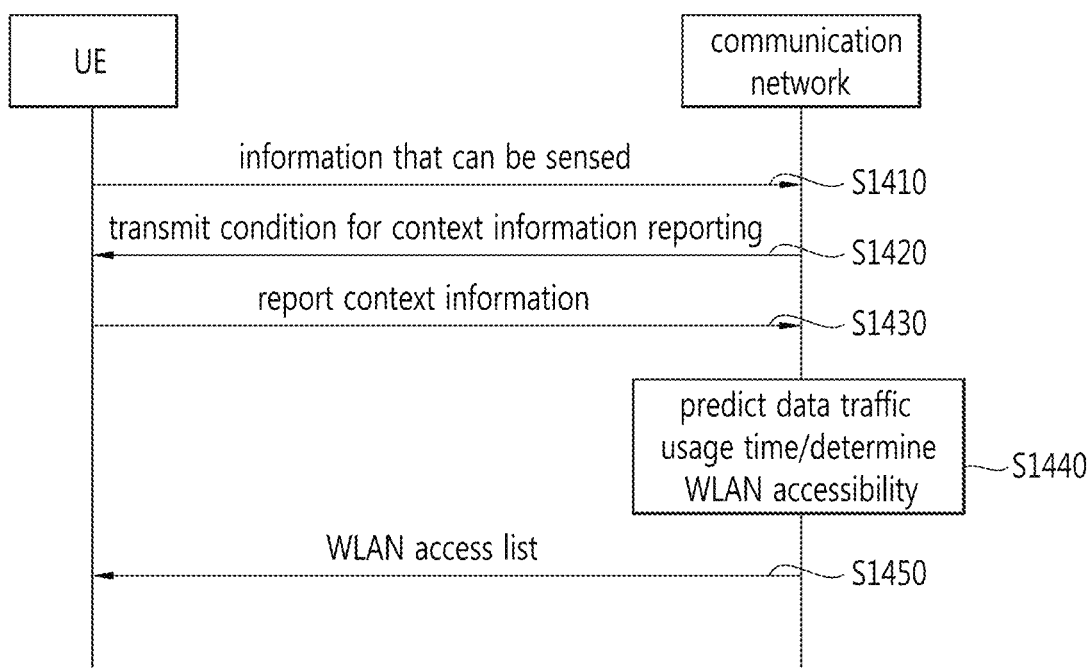
FIG. 14 is a flowchart for explaining data communication based on a context information usage between a UE and a communication network according to an embodiment of the present invention.

FIG. 14 is a flowchart for explaining data communication based on a context information usage between a UE and a communication network according to an aspect of the present invention.

As illustrated, the UE may report context information through communication with respect to the communication network, and may receive a WLAN access list.

The UE may include a plurality of sensors capable of sensing a UE state. According to an embodiment of the present invention, the UE may include an illumination sensor, a sound sensor, or a gyro sensor. User context information may be computed on the basis of values sensed by these sensors.

Accordingly, before the user context information is reported to the communication network, the UE may transmit information regarding a sensing value that can be sensed by the UE, that is, its sensing ability, to the communication network (step S1410).

Control signals and data signals based on the present invention described hereinafter may be transmitted/received according to a radio resource control (RRC).

Upon reception of information that can be sensed from the UE, the communication network may transmit a condition for context information reporting to the UE on the basis of the information that can be sensed (step S1420).

The condition for the context information reporting may include at least one of a trigger condition of the context information reporting, a condition for a context information reporting period, a type of context information to be reported, and a user weight computation condition. That is, the condition for the context information reporting according to the present embodiment may include a configuration condition required by the UE 1 to report the context information.

For example, as the trigger condition, the communication network may configure to report the context information when the UE is completely charged. Alternatively, the communication network may configure a parameter used for a user weight to be computed by the UE, or may configure a period according to which a sensor measures the UE state.

The UE may report context information including location information and the user weight to the communication network according to the condition for the context information reporting (step S1430).

The UE may recognize the user weight and the location information by using a method described with reference to FIG. 2, FIG. 3, FIG. 7, and FIG. 8.

When the user weight and the location information are recognized, the UE may report to the communication network at least one of information regarding whether the user weight and the location information, i.e., a sensed location, are included in an upper usage-frequency location range and information regarding whether the UE is being charged (step S1440).

If the UE moves less frequently and an amount of light measured by a sensor and a noise level are changed in a small range, the user weight has a high value. In this case, the communication network 2 may predict that a data traffic usage time is not great.

On the other hand, in a context in which the UE can be used freely, there is a tendency that an average data usage time of the user is long and a change in a sensing value of the UE is great. In this case, the communication network may predict that the data traffic usage time is great.

If the UE is located in a place frequently visited in the past or if a battery is currently being charged, the communication network may determine that there is a high possibility that an access is made through an alternative to a current mobile communication. That is, according to whether the UE is currently within a usage-frequency rank range, for example, is located in a place within an upper third range, or whether a battery of the UE is currently being charged, the communication network may determine that the UE can access the WLAN.

For example, in many cases, WiFi is installed in frequently visited places such as a school or a favorite cafe. In addition, there is a high possibility that WiFi or a wired computer is installed in such a place as a house or office in which the UE is often charged.

Figure 15:
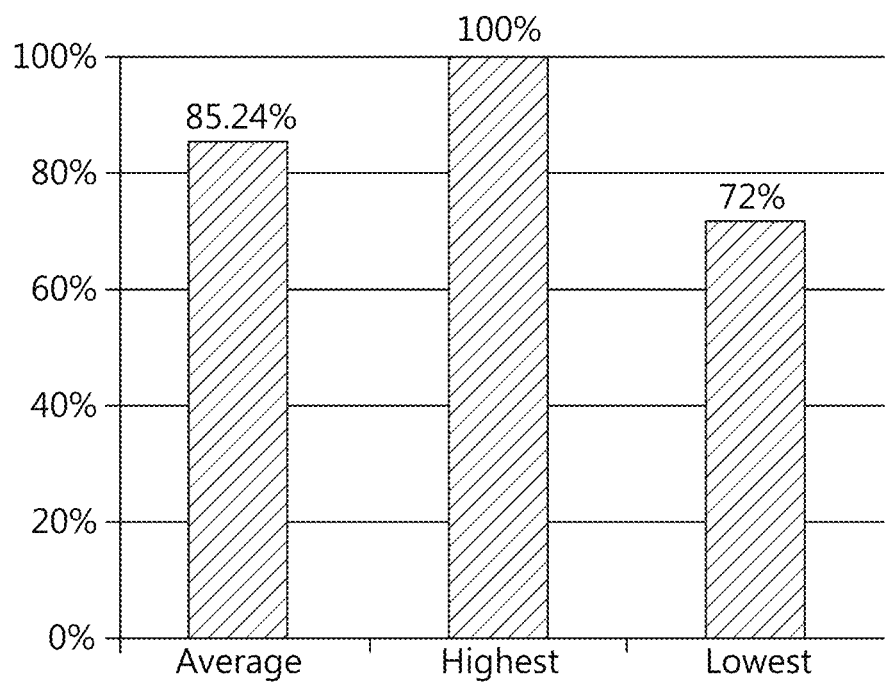
FIG. 15 is a graph showing a result of predicting wireless local area network (WLAN) accessibility of a communication network according to an embodiment of the present invention.

FIG. 15 is a graph showing a result of predicting WLAN accessibility of a communication network according to an embodiment of the present invention.

As illustrated, as a result of predicting the WLAN accessibility on the basis of user's location information or whether the UE is being charged, it shows that a prediction possibility is high up to 100%, and a success rate of at least about 85% on average.

If the UE can access the WLAN, the communication network may transmit information regarding a WLAN access list to the UE (step S1450).

The UE may access any one of WLANs included in the WLAN access list received from the communication network.

As such, according to one aspect of the present invention, a network is aware of a variety of context information of a user, and thus a suitable radio resource management scheme can be applied to the user. Therefore, quality of experience (QoE) of the user can be increased.

According to an aspect of the present invention, there is provided a method in which a network determines whether a user equipment (UE) can access a wireless local area network (WLAN) and establishes a connection thereto, increases a radio duration transfer rate of a user by transmitting data in parallel on the basis of a network context, and ensures QoE in a mobile communication network congestion context.

Accordingly, an efficiency of a traffic load management of the mobile communication network can be increased, and the QoE can be ensured with respect to the mobile communication network by increasing a radio duration transfer rate of the user in the congestion context.

According to another aspect of the present invention, there is provided a scheduling method capable of scheduling a radio resource preferentially to a user expected to have a short data usage time and a user using a real-time service by using user context information acquired through sensing information of a UE and a service type in use.

Accordingly, total QoE can be increased.

Although the aforementioned exemplary system has been described on the basis of a flowchart in which steps or blocks are listed in sequence, the steps of the present invention are not limited to a certain order. Therefore, a certain step may be performed in a different step or in a different order or concurrently with respect to that described above. Further, it will be understood by those ordinary skilled in the art that the steps of the flowcharts are not exclusive. Rather, another step may be included therein or one or more steps may be deleted within the scope of the present invention.

What is claimed is:

1. A method of receiving data in a user equipment (UE), the method comprising:
    sensing a current location for each of a plurality of specific periods;
    determining whether the sensed location is included in a specific upper usage-frequency location range for a specific UE;
    sensing whether the specific UE is being charged;
    transmitting context information through a communication network, the context information related to whether the sensed location is included in the specific upper usage-frequency location range for the specific UE and whether the specific UE is being charged;
    accessing an accessible wireless local area network (WLAN) upon receiving a WLAN access instruction from the communication network, the WLAN access instruction received when the context information indicates that the sensed location is included in the specific upper usage-frequency location range and that the specific UE is being charged;
    transmitting an Internet protocol (IP) address for the accessed WLAN through the communication network;
    receiving data in parallel from the communication network and the WLAN; and
    adjusting the received data based on information included in an IP header and transmission control protocol (TCP) header of the received data, wherein the specific upper usage-frequency location range includes information related to locations each having a rank higher than a specific threshold among pre-stored locations of the specific UE, wherein the pre-stored locations are sensed by the specific UE during a specific time period, wherein a rank of each of the pre-stored locations is derived based on a frequency of occurrence of the location, wherein the frequency of occurrence of each of the pre-stored locations is sensed during the specific time period, and wherein the frequency of occurrence of each of the pre-stored locations corresponds to a number of times the location is sensed by the specific UE during the specific time period.

2. The method of claim 1, wherein adjusting the received data comprises:

recognizing, in a network layer, that the received data is transmitted from a same host according to whether a source IP address and identification included in the IP header have a same value and re-assembling the data;

recognizing, in a transport layer, that the received data is transmitted from the same host according to whether the source IP address and a source port and destination port included in the TCP header have a same value; and sorting and reading data based on a sequence number included in the TCP header.

3. A method of transmitting data in a user equipment (UE), the method comprising:

establishing a first transmission control protocol (TCP) connection between a specific user UE and a mobile communication network;

receiving context information of the specific UE through the mobile communication network, the context information related to whether a location of the specific UE is included in a specific upper usage-frequency location range and whether the specific UE is being charged;

determining whether the specific UE can access an accessible wireless local area network (WLAN) based on the received context information;

instructing the specific UE to access the WLAN when the context information indicates that the location is included in the specific upper usage-frequency location range and that the specific UE is being charged;

establishing a second TCP connection between the specific UE and the WLAN;

receiving data from a host; and transmitting the received data to the specific UE in parallel through the first TCP connection and the second TCP connection, wherein the specific upper usage-frequency location range includes information related to locations each having a rank higher than a specific threshold among pre-stored locations of the specific UE, wherein the pre-stored locations are sensed by the specific UE during a specific time period, wherein a rank of each of the pre-stored locations is derived based on a frequency of occurrence of the location, wherein the frequency of occurrence of each of the pre-stored locations is sensed during the specific time period, and wherein the frequency of occurrence of each of the pre-stored locations corresponds to a number of times the location is sensed by the specific UE during the specific time period.

4. The method of claim 3, wherein transmitting the received data comprises adjusting a TCP congestion window by using a round trip time (RTT) of data transmitted through the mobile communication network and an RTT of data transmitted through the WLAN.

5. The method of claim 4, further comprising:

increasing a size of an RTT-based window when an RTT of data transmitted through the WLAN is less than both a predetermined threshold and the RTT of data transmitted through the mobile communication network; and increasing an amount of data transmitted to the UE through the WLAN and increasing a size of the TCP congestion window when a confirmation signal is received from the UE in response to the data transmitted through the WLAN.

6. The method of claim 4, further comprising:

decreasing a size of the TCP congestion window when the RTT of data transmitted through the WLAN is greater than a predetermined threshold or greater than the RTT of data transmitted through the mobile communication network; and decreasing an amount of data transmitted to the UE through the WLAN and decreasing a size of the TCP congestion window when a confirmation signal is received from the UE in response to the data transmitted through the WLAN.

7. The method of claim 3, further comprising decreasing an amount of data transmitted to the UE through the WLAN when a confirmation signal is not received from the UE in response to the data transmitted through the WLAN.

* * * * *